US005560986A

United States Patent [19]

Mortimer, Jr.

[11] Patent Number: 5,560,986

[45] Date of Patent: Oct. 1, 1996

[54] POROUS POLYTETRAFLUOROETHYLENE SHEET COMPOSITION

[75] Inventor: William P. Mortimer, Jr., Conowingo, Md.

[73] Assignee: W. L. Gore & Associates, Inc., Newark, Del.

[21] Appl. No.: 252,159

[22] Filed: May 31, 1994

Related U.S. Application Data

[63] Continuation of Ser. No. 795,580, Jan. 2, 1992, abandoned, which is a continuation-in-part of Ser. No. 515,302, Apr. 27, 1990, abandoned.

[51] Int. Cl.[6] .............................. B32B 5/14; B32B 15/00

[52] U.S. Cl. .................................... 428/308.4; 428/304.4; 428/306.6; 428/372; 428/375; 428/379; 428/421; 428/422; 428/910; 525/199; 525/200; 174/36; 174/110 FC

[58] Field of Search .................................... 428/372, 379, 428/375, 421, 422, 317.9, 343, 318.6, 318.4, 319.3, 319.7, 319.9, 317.1, 317.5, 317.7, 306.6, 308.4, 304.4; 525/199, 200; 521/54; 174/110 FC, 36

[56] References Cited

U.S. PATENT DOCUMENTS

| | | | |
|---|---|---|---|
| 3,484,503 | 12/1969 | Magner et al. | 260/900 |
| 3,953,566 | 4/1976 | Gore | 264/288 |
| 4,036,802 | 7/1977 | Poirier | 428/379 |
| 4,128,693 | 12/1978 | Dhami et al. | 428/379 |
| 4,216,265 | 8/1980 | Sulzbach | 428/402 |
| 4,252,859 | 2/1981 | Concannon et al. | 525/200 |
| 4,379,858 | 4/1983 | Suzuki | 521/54 |
| 4,454,249 | 6/1984 | Suzuki | 521/54 |
| 4,555,543 | 11/1985 | Effenberger et al. | 525/199 |
| 4,701,576 | 10/1987 | Wada et al. | 174/110 FC |
| 4,713,418 | 12/1987 | Logothetis et al. | 525/199 |
| 4,866,212 | 9/1989 | Ingram | 174/110 FC |
| 4,882,113 | 11/1989 | Tu et al. | 264/127 |
| 4,914,158 | 4/1990 | Yoshimura et al. | 525/199 |
| 4,935,467 | 6/1990 | Cheng et al. | 525/199 |
| 4,973,609 | 11/1990 | Browne | 521/81 |
| 5,051,479 | 9/1991 | Logothetis et al. | 525/200 |
| 5,059,263 | 10/1991 | Sahakian et al. | 174/110 FC |
| 5,143,783 | 9/1992 | Shimizu, et al. | 427/327 |
| 5,273,694 | 12/1993 | Perusich et al. | 264/41 |
| 5,393,929 | 2/1995 | Yagihashi | 428/422 |
| 5,415,939 | 5/1995 | Yeung | 428/422 |

FOREIGN PATENT DOCUMENTS

| | | | |
|---|---|---|---|
| 010152 | 7/1979 | European Pat. Off. . | |
| 138524 | 5/1984 | European Pat. Off. . | |
| 0256748 | 2/1988 | European Pat. Off. . | |
| 416806 | 3/1991 | European Pat. Off. . | |
| 521588 | 1/1993 | European Pat. Off. | 525/199 |
| 61-16840 | 1/1986 | Japan . | |

*Primary Examiner*—Patrick J. Ryan
*Assistant Examiner*—J. M. Gray

[57] ABSTRACT

A composite of a thermoplastic copolymer of tetrafluoroethylene and perfluoro(propyl vinyl ether), and a porous membrane of polytetrafluoroethylene, at least a portion of the thermoplastic copolymer being dispersed within the pores of the porous polytetrafluoroethylene. The composite is useful as insulation for wire and cable.

3 Claims, 1 Drawing Sheet

POROUS POLYTETRAFLUOROETHYLENE SHEET COMPOSITION

CROSS-REFERENCE TO RELATED APPLICATIONS

This application is a continuation of application Ser. No. 07/795,580 filed Jan. 2, 1992, now abandoned, which is a continuation-in-part of application Ser. No. 07/515,302, filed Apr. 27, 1990 now abandoned.

FIELD OF THE INVENTION

The present invention relates to a fluoropolymer composition useful in producing a covering, such as for insulating electrical wire. The invention is also directed to a method of forming the covering, and to the covered wire.

BACKGROUND OF THE INVENTION

The use of copolymers formed from tetrafluoroethylene (TFE) and perfluoro (propyl vinyl ether) (PPVE) for the insulation of wire is well known. The polymers have good heat resistance, and high resistance to solvent attack. These attributes are desirable for use in a wide variety of applications involving jacketing or covering of wire and cable constructions. Other desirable attributes in coverings for such applications include good mechanical properties such as resistance to abrasion and resistance to cut-through of insulation by sharp edges. However, the properties of these copolymers are poor in these respects.

Attempts have been made in the past to improve the mechanical properties of TFE copolymers by including additives such as glass spheres, silica flake and the like. However, the improvements achieved with such compositions are generally limited and often at the expense of other desirable features. For example, a degradation of electrical properties or mechanical properties, such as flexibility, can result.

Attempts have also been made in the past to improve the mechanical properties of the fluoropolymers by mixing with other polymers having better mechanical properties, such as polyphenylene sulphide, polyphenylene oxide, etc. However, these other polymers are in general incompatible with fluororpolymers so that there is difficulty in producing intimate blends.

The present invention attempts to mitigate some these problems.

SUMMARY OF THE INVENTION

This invention comprises a composite sheet of a porous membrane of polytetrafluoroethylene and a thermoplastic copolymer of tetrafluoroethylene and perfluoro(propyl vinyl ether) wherein at least a portion of the thermoplastic copolymer is dispersed within the pores of the porous membrane of polytetrafluoroethylene. Preferably the thermoplastic copolymer will comprise 5–95 weight percent of the composite.

In one embodiment, the thermoplastic copolymer will comprise about 5–50 weight percent of the composite. In this embodiment, the composite is useful as insulation on wire or cable, especially as electrical insulation.

In another embodiment, the thermoplastic copolymer will comprise about 50–95 weight percent of the composite. In this embodiment, the composite is useful as a reinforced thermoplastic copolymer film.

Another aspect of the invention is a process for preparing the composite which comprises mixing the thermoplastic copolymer with a coagulated fine powder polytetrafluoroethylene resin or with a dispersion of the fine powder and coagulating the solids to obtain a resin blend, preparing pellets of the resin blend, forming a tape of the pellets and stretching and possibly compressing the tape until a desired degree of porosity is attained in the resulting composite.

DESCRIPTION OF THE INVENTION

Figure 1:
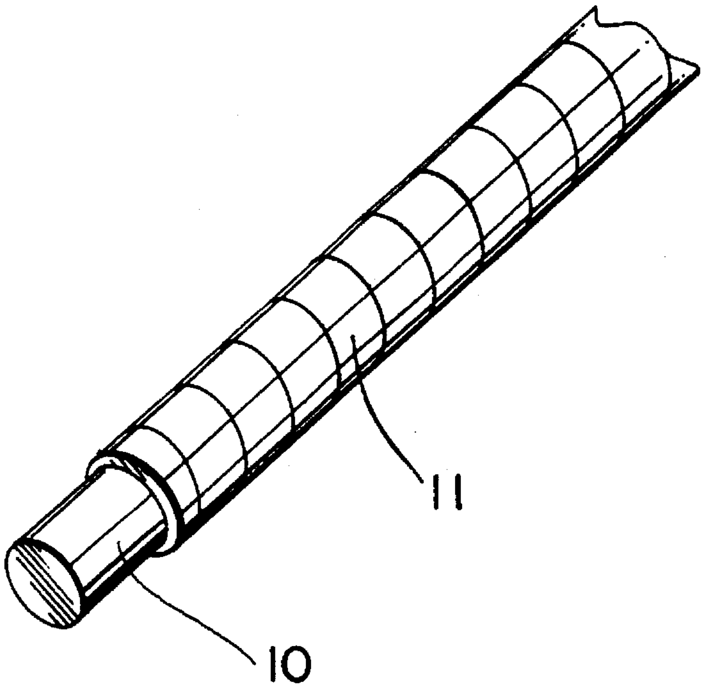
FIG. 1 depicts a cable 10 formed from electrical wire, such as copper, around which a tape 11 of a composite of the invention has been applied.

The particulate copolymer of tetrafluoroethylene and perfluoro(propyl vinyl ether) TFE/PPVE, preferably has a particle size in the range 1 to 180 microns preferably 20 to 100 microns, but particle size or shape is not critical.

The porous polytetrafluoroethylene (PTFE) membrane component is made from the coagulated dispersion type of PTFE. As is well known, polytetrafluoroethylene (PTFE) can be produced in three quite distinct forms having different properties viz; granular PTFE, coagulated dispersion PTFE, and liquid PTFE dispersions. Coagulated dispersion PTFE is also referred to as fine powder PTFE. In the present invention, the fine powder PTFE resin can be used in powder form; or alternatively, the resin can be coagulated from an aqueous dispersion in the presence of perfluoroalkoxy TFE/PPVE copolymer powder also present in the dispersion. The flocculated mixture is then decanted and dried.

After drying, the flocculated material, in particulate form, is lubricated for paste extrusion with an ordinary lubricant known for use in paste extrusion, and is pelletized. The pellets are preferably aged at 40°–60° C. and are then paste extruded into a desired shape, usually a film. The extruded shape is then stretched, preferably in a series of at least two stretch steps while heating at between 35°–360° C. until a desired degree of porosity and strength is attained. The porosity occurs through the formation of a network of interconnected nodes and fibrils in the structure of the stretched PTFE film, as more fully described in U.S. Pat. No. 3,953,566.

At the stretch temperatures employed, the TFE/PPVE copolymer melts and, depending on the amount present, may become entrapped in the pores or nodes formed, may coat the nodes or fibrils, or may be present on the outer surface of the membrane formed. Most likely a combination of each embodiment occurs, depending on whether the copolymer and the PTFE remain as distinct moieties.

The composite is useful as a insulation covering for wire and cable, particularly in electrical applications. In tape form, the composite can simply be wrapped around the wire or cable in overlapping turns. It is believed that the presence of the TFE/PPVE copolymer aids in adhering the layers of tape wrap to one another. The composite can be sintered either before or after wrapping if desired to improve cohesiveness and strength of the tape per se. Once the composite is prepared, it can be compressed, if desired, to increase the density of the composite. Such compression does not significantly affect the increased matrix strength that is associated with expanded porous PTFE. Compression is desired if end uses such as high voltage insulation where high cut-through resistance is desired.

It has been found that wire and cable insulation made from the composites of this invention have unexpectedly better cut-through resistance, strength and abrasion resistance than insulation made from the TFE/PPVE copolymer alone or from non-expanded PTFE.

EXAMPLES

Example 1

302 g. (16.7 wt. %) of a tetrafluoroethylene/perfluoro-(propyl vinyl ether) copolymer powder (PFA powder) was added to 1.5 liters of methanol and diluted with 20.1 liters of deionized water to form a dispersion. This was mixed for 30 seconds in a baffled 5 gallon container.

Next, 6500 g. of aqueous dispersion containing 1600 g. (12.8 wt. %) of dispersion-produced polytetrafluoroethylene was mixed with the PFA powder dispersion. Then, 6.4 g. polyethylene imine was added to coagulate the solids from the mixture. After about 20 seconds of stirring, the phases separated. The clear liquid was decanted and the remaining solids dried at 160° C. for 24 hours.

The solids, in particulate form, were lubricated with mineral spirits (19% by weight) and pelletized under vacuum. The pellets were aged at 49° C. for about 24 hours, and were then extruded into tape. The tape was calendared to a thickness of 16.5 mil. and then dried to remove lubricant.

The dried tape was stretched in three steps. In the first stretch step, the tape was expanded longitudinally 93% (1.93 to 1) at 270° C. at an output rate of 105 feet per minute. In the second step, the tape was expanded longitudinally at a rate of 20:1 at 290° C. at an output rate of 3.8 feet per minute. In the third step, the tape was expanded longitudinally at a ratio of 2:1 at 325° C. at an output of 75 feet per minute.

The resulting tape was then subjected to heat at 330° C. for about 6 seconds.

It was then compressed to almost full density. The bulk density was 2.0 gm/cc.

Example 2

The procedure of Example 1 was followed, except that in the first stretch step the stretch was at 1.9 to 1 instead of 1.93 to 1, and in the second stretch step the temperature was 300° C., and in the third stretch step, the temperature was 360° C., and the tape was subjected to heat at 360° C. for about 6 seconds.

The tape was not compressed. The resulting density was 0.7 gm/cc.

Cut-Through Resistance

Tapes produced by the method given in Example 1 that had been compressed to almost full density to a thickness of 0.0007 inches (18 microns) were slit and wrapped onto 20 AWG, 19 strand silver plated electrical wire conductor, to an insulation wall thickness of 0.003 inches (75 microns).

The insulated wire was then heat treated in air at 350° C. for 15 minutes, to fuse the insulation material.

The resultant wire was tested for dynamic cut-through resistance according to the test method given in BS G 230. BS G 230 (British Standard, Group 230) is a test specification for general requirements for aircraft electrical cables. Test results are given in Table 1.

TABLE 1

| Sample | Dynamic Cut-Through in Newtons at Room Temperture |
|---|---|
| 20 AWG, 19 strand, silver plated | 91 |
| copper conductor, with 0.003 inch | 92 |
| wall of fused insulation tape | 65 |
| | 89 |
| Average = | 84 |

Mechanical Properties

Expanded tape made by the method given in Example 1 was slit and a 0.15 mm thick layer (0.1 mm post-sinter) was wrapped on to 20 AWG (American Mire Gauge) 19 strand nickel plated copper conductor. (Sample 3).

For the purposes of comparison, separate samples of conductor were insulated with standard PTFE or with TFE/PPVE jackets (Samples 1 and 2 respectively).

The overall diameter of all samples was maintained at 1.5 mm, resulting in similar wall thicknessess to allow the samples to be compared with one another.

The mechanical properties, with respect to scrape abrasion and cut-through resistance of the insulated wire samples, were measured according to the text method given in BS G 230. The results are given in Table 2 and show the overall improvement in the mechanical properties of the composite insulation materials when compared with the individual homogeneous insulation materials.

TABLE 2

| Sample | Dynamic Cut-Through in Newtons (N) at Room Temperature | Scrape Abrasion at Room Temperature: 8 Newtons Load | Scrape Abrasion at Room Temperature: 4 Newtons Load |
|---|---|---|---|
| 1 (comparison) | 35 | 12 | 310 |
| 2 (comparison) | 45 | 46 | 610 |
| 3 | 115 | 66 | 260 |

Sample 1 — 20 AWG, 19 strand, nickel-plated copper conductor with 0.25 mm wall of PTFE insulation.
Sample 2 — 20 AWG, 19 strand, nickel-plated copper conductor with 0.25 mm wall of TFE/PPVE insulation.
Sample 3 — 20 AWG, 19 strand, nickel-plated copper conductor with 0.25 mm wall of (expanded and densified) PTFE and TFE/PPVE blended insulation material (according to Example 1).

I claim:

1. An electrical insulative tape which comprises:

(a) a porous membrane of stretched polytetrafluoroethylene in which the pores are defined by a structural network of nodes interconnected by fibrils; and (b) moieties of a thermoplastic copolymer of tetrafluoroethylene and perfluoro(propyl vinyl ether) dispersed within said pores.

2. The tape of claim 1 wherein the copolymer moieties are present in an amount of 5–50 weight percent of the tape.

3. An insulated electrical wire comprising an electrically conductive wire and an electrical insulative tape wrapped around said wire in which the tape comprises the tape defined in claim 1.

* * * * *